INVENTOR.
Milton O. Boone
BY
ATTORNEY

Patented Apr. 26, 1949

2,468,026

UNITED STATES PATENT OFFICE 2,468,026

PALLET

Milton O. Boone, United States Army,
San Francisco, Calif.

Application December 10, 1943, Serial No. 513,788

2 Claims. (Cl. 248—120)

(Granted under the act of March 3, 1883, as
amended April 30, 1928; 370 O. G. 757)

The invention described herein, if patented, may be manufactured and used by or for the Government for governmental purposes, without the payment to me of any royalty thereon.

This invention relates to pallets, and more particularly to pallets of the type which are employed in warehouses, storage depots and the like, for moving, handling and stacking material, containers and articles of merchandise.

Pallets are extensively used in the storage and handling of various materials, goods, packages, containers and articles of merchandise. Frequently the conditions in the warehouse require the handling and stacking of large numbers of small articles or containers, and it is necessary that a number of the articles be stacked upon a pallet and handled and stacked as a relatively large integral unit. "Lift trucks" of various types are employed, but most modern trucks are provided with lifting forks having projecting fingers which are constructed to extend into or below the pallet and lift it with the load.

Single and double-faced pallets have been provided heretofore, but either their ends or sides are closed or partly closed, consequently the pallet can only be engaged by the lifting fork of a truck from two directions. Conditions in the warehouse, such as aisle arrangement, space limitations, stacking requirement and imposed loads, render it highly desirable that a relatively strong, rigid, two-faced, and inexpensive pallet be provided. Furthermore, it is mandatory that the pallet be so constructed and arranged that a lifting fork may engage it in lifting relation from any direction.

It is, therefore, an object of this invention to provide a pallet of relatively strong and rigid construction which is arranged to receive the projecting fingers of a lifting fork at either side or end thereof, thus permitting the lifting truck to approach the pallet from any direction.

Another object of this invention is to provide a double-faced, four-way pallet having substantially similar base members and load-engaging members supported on a spacer beam structure which is constructed and arranged so that a supporting beam may be interposed between the loads and the lifting fork to safely support relatively great loads.

A further object of the invention is to provide a pallet having a relatively rigid strong body or spacer beam structure to which base members and load-supporting members are detachably secured, thereby permitting the replacement of these members when required without dismantling the body.

It is also an object of this invention to provide a pallet of generally improved construction, whereby the device will be simple, durable and inexpensive in construction as well as convenient, practical, serviceable, and efficient in its use.

With the foregoing and other objects in view which will appear as the description proceeds, the invention resides in the combination and arrangement of parts and in the details of construction herein described and claimed, it being understood that various changes in form, proportion and minor details of construction may be made within the scope of the claims without departing from the spirit or sacrificing advantages of the invention.

For a complete disclosure of the invention, a detail description thereof will now be given in connection with the drawings forming a part of the specification wherein.

Referring to the drawings, in which similar reference characters designate corresponding parts.

Figure 1:
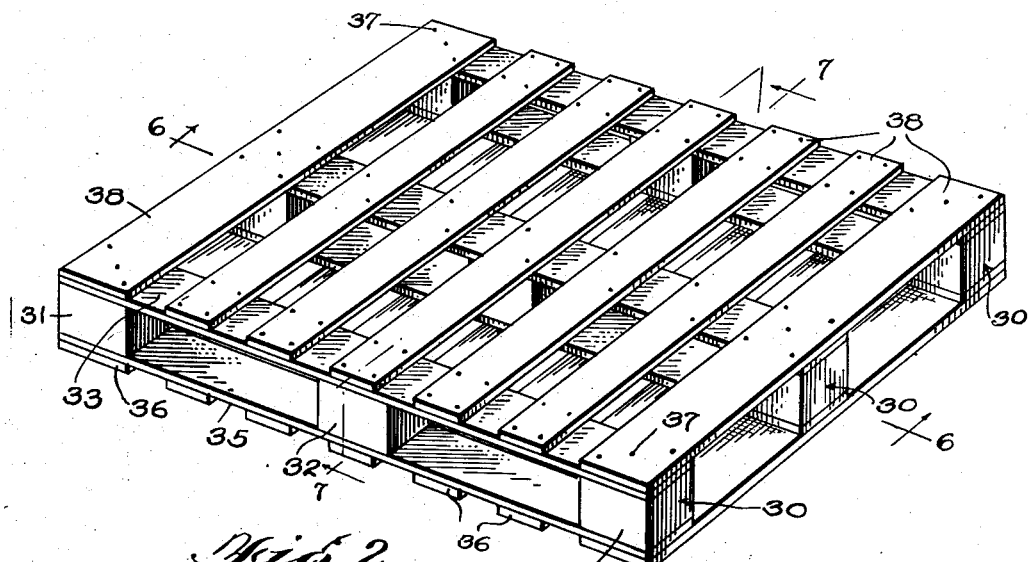
Figure 1 is a perspective view depicting a modified form of the invention.
Figure 2:
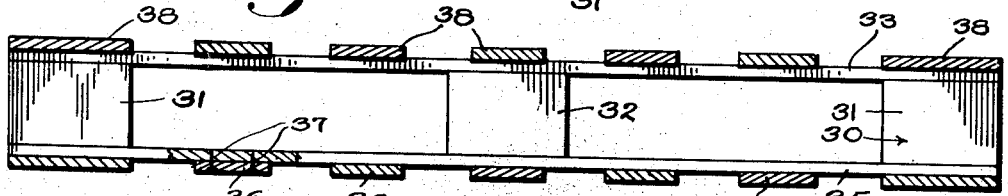
Figure 2 is a longitudinal sectional view taken on the line 6—6 of Figure 1.
Figure 3:
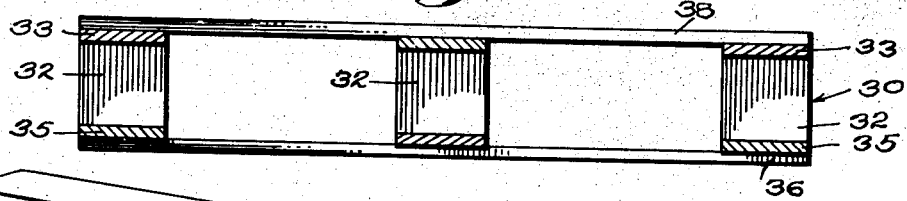
Figure 3 is a transverse sectional view taken on the line 7—7 of Figure 1.
Figure 4:
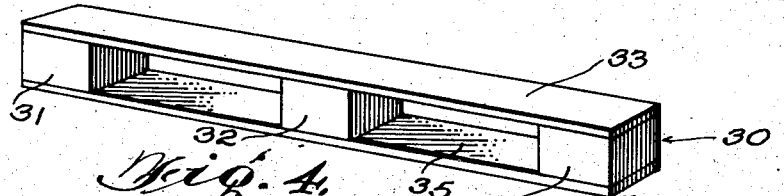
Figure 4 is a perspective view of a component of the spacer beam structure employed in the modified form of the invention.

Figures 1 to 4 of the drawings depict a form of the invention in which a spacer beam structure is formed by a plurality of spaced parallel composite beams or stringers 30. Any preferred number of composite beams or stringers may be provided, but a preferred arrangement employs three, as depicted in the drawings. Each composite beam 30 includes terminal spacer blocks 31 and an intermediate spacer block 32, and the spacer blocks 31 and 32 have spaced parallel upper and lower stringer or beam members 33 and 35 suitably secured to the upper and lower faces thereof by nails or other suitable securing devices. By this arrangement, each composite beam or stringer 30 has its terminal portions reinforced by the blocks 31 and its intermediate portion reinforced by block 32, thus providing an open beam or stringer of relatively light weight and great strength.

A plurality of spaced parallel base members, boards or slats 36 are secured to the lower faces of the lower beam or stringer member 35 by any suitable securing devices, preferably nails 37. The base slats 36 are disposed in perpendicular relation to the composite beams or stringers 30, so that the terminals of each slat 36 engage the lower faces of each terminal beam structure, and the intermediate portion of each slat 36 engages the lower face of the beam member 35 of the intermediate beam.

Load-supporting members, boards or slats 38, similar to the base slats 36 are secured to the upper faces of the upper beam members 33 in perpendicular relation thereto, thus providing a light two-face pallet of relatively great strength and rigidity, and which is provided with openings at both ends and both sides which are substantially co-extensive with the over-all dimensions of the ends and sides. By this arrangement either face of the pallet may be disposed upwardly, and the lifting fork of a truck may engage the pallet from any direction.

From the foregoing description taken in connection with the attached drawings, it will be apparent to those skilled in the art, that I have devised a relatively light yet strong and durable four-way pallet, that the load bearing surface may be replaced from time to time as desired, and that structures of this type are generally improved.

Having thus described my invention what I claim as new and useful is:

1. A pallet capable of receiving the forks of a fork-lift trunk in each of its four edges, comprising a plurality of parallel base members disposed in a single plane, a plurality of parallel load-supporting members disposed parallel to the base members and in a plane spaced from the plane of the base members, a plurality of parallel unitary composite spacer beams interposed between the base members and load-supporting members and spaced apart to provide openings adapted to receive the forks of a fork-lift truck on two edges of the pallet, each of said spacer beams being composed of upper and lower beam members and supporting blocks interposed between said members and so disposed as to provide openings adapted to receive the forks of a fork-lift truck on the other two edges of the pallet.

2. A pallet capable of receiving the forks of a fork-lift trunk in each of its four edges, comprising a plurality of parallel base members disposed in a single plane, a plurality of parallel load-supporting members disposed parallel to the base members and in a plane spaced from the plane of the base members, three parallel unitary composite spacer beams interposed between the base members and load-supporting members and disposed at two edges and center line of the pallet to provide openings adapted to receive the forks of a fork-lift trunk on the two edges of the pallet, each of said spacer beams being composed of upper and lower beam members and supporting blocks interposed between said members and so disposed as to provide openings adapted to receive the forks of a fork-lift truck on the other two edges of the pallet.

MILTON O. BOONE.

REFERENCES CITED

The following references are of record in the file of this patent:

UNITED STATES PATENTS

| Number | Name | Date |
|---|---|---|
| 2,288,052 | Walker | June 30, 1942 |
| 2,297,347 | Cruickshank | Sept. 29, 1942 |
| 2,311,280 | Quayle | Feb. 16, 1943 |

Certificate of Correction

Patent No. 2,468,026.  April 26, 1949.

MILTON O. BOONE

It is hereby certified that errors appear in the printed specification of the above numbered patent requiring correction as follows:

Column 3, line 22, and column 4, lines 6 and 16, claims 1 and 2 respectively, for the word "trunk" read *truck*;

and that the said Letters Patent should be read with these corrections therein that the same may conform to the record of the case in the Patent Office.

Signed and sealed this 27th day of September, A. D. 1949.

[SEAL]

THOMAS F. MURPHY,
*Assistant Commissioner of Patents.*